US007141195B2

(12) United States Patent
Winterowd et al.

(10) Patent No.: US 7,141,195 B2
(45) Date of Patent: Nov. 28, 2006

(54) PROCESS FOR MAKING ENGINEERED LIGNOCELLULOSIC-BASED PANELS

(75) Inventors: Jack G. Winterowd, Puyallup, WA (US); Roger M. Shantz, Enumclaw, WA (US); Daniel V. Hanson, Auburn, WA (US); Michael N. Taylor, Tacoma, WA (US)

(73) Assignee: Weyerhaeuser Co., Federal Way, WA (US)

( * ) Notice: Subject to any disclaimer, the term of this patent is extended or adjusted under 35 U.S.C. 154(b) by 476 days.

(21) Appl. No.: 10/655,996

(22) Filed: Sep. 5, 2003

(65) Prior Publication Data

US 2005/0051921 A1 Mar. 10, 2005

(51) Int. Cl.

*B29C 59/00* (2006.01)
*B29C 67/24* (2006.01)
*B29C 67/00* (2006.01)

(52) U.S. Cl. ...................... 264/122; 264/109; 264/123; 264/125; 264/126

(58) Field of Classification Search ......... 264/109–128
See application file for complete search history.

(56) References Cited

U.S. PATENT DOCUMENTS

| | | | |
|---|---|---|---|
| 3,632,734 A | 1/1972 | Haygreen | |
| 3,919,017 A | 11/1975 | Shoemaker et al. | |
| 4,100,328 A | 7/1978 | Gallagher | |
| 4,131,705 A | 12/1978 | Kubinsky | |
| 4,350,543 A | 9/1982 | Bruguera | |
| 4,405,542 A | 9/1983 | Greer | |
| 4,609,513 A | 9/1986 | Israel | |
| 4,701,383 A | 10/1987 | Janiga | |
| 4,833,182 A | 5/1989 | Israel et al. | |
| 4,937,024 A | 6/1990 | Hickson | |
| 4,950,433 A | 8/1990 | Chiu | |
| 5,002,713 A | 3/1991 | Palardy et al. | |
| 5,049,334 A | 9/1991 | Bach | |
| 5,057,166 A | 10/1991 | Young, Sr. et al. | |
| 5,064,689 A | 11/1991 | Young, Sr. et al. | |
| 5,435,954 A | 7/1995 | Wold | |
| 5,554,330 A | 9/1996 | Flannery et al. | |
| 5,607,633 A | 3/1997 | Sleeter et al. | |
| 5,755,917 A | 5/1998 | Barnes | |
| 5,902,442 A | 5/1999 | Phillips et al. | |
| 5,913,990 A | 6/1999 | Kramer | |
| 5,972,266 A | 10/1999 | Fookes et al. | |
| 5,993,709 A | 11/1999 | Bonomo et al. | |
| 6,001,286 A | 12/1999 | Sleeter | |
| 6,120,717 A | 9/2000 | Hsu et al. | |
| 6,129,871 A | 10/2000 | Suzuki et al. | |
| 6,214,265 B1 | 4/2001 | Rosthauser et al. | |
| 6,224,800 B1 | 5/2001 | Rosthauser | |
| 6,277,310 B1 | 8/2001 | Sleeter | |
| 6,294,117 B1 | 9/2001 | Rosthauser et al. | |
| 6,306,241 B1 | 10/2001 | Chiu | |
| 6,352,661 B1 | 3/2002 | Thompson et al. | |
| 6,365,077 B1 | 4/2002 | Pott et al. | |
| 6,368,528 B1 | 4/2002 | Whelan et al. | |
| 6,368,529 B1 | 4/2002 | Lloyd et al. | |
| 6,403,000 B1 | 6/2002 | Symons | |
| 6,416,696 B1 | 7/2002 | Miller et al. | |
| 6,428,902 B1 | 8/2002 | Amundson et al. | |
| 6,458,238 B1 | 10/2002 | Mente et al. | |
| 6,464,820 B1 | 10/2002 | Mente et al. | |
| 6,479,127 B1 | 11/2002 | Kornicer et al. | |
| 6,511,567 B1 | 1/2003 | Ruggie et al. | |
| 6,518,333 B1 | 2/2003 | Liu et al. | |
| 6,569,540 B1 | 5/2003 | Preston et al. | |
| 6,572,804 B1 * | 6/2003 | Randall et al. | 264/115 |
| 2002/0168476 A1 | 11/2002 | Pasek et al. | |
| 2003/0035921 A1 | 2/2003 | Kornicer et al. | |

FOREIGN PATENT DOCUMENTS

| | | |
|---|---|---|
| CA | 989289 | 5/1976 |
| CA | 1315610 | 4/1993 |
| WO | WO 01/79339 A1 | 10/2001 |
| WO | WO 02/30642 A1 | 4/2002 |

* cited by examiner

*Primary Examiner*—Stephen J. Lechert, Jr.

(57) ABSTRACT

A process for making engineered lignocellulosic-based panels with superior strength and dimensional stability. The process comprising adding to green lignocellulosic particles a low-nitrogen content, high molecular weight, phenol-formaldehyde resin before the green particles are dried. The resin is added in an amount from about 1 to 25 weight percent based on the dry weight of the green lignocellulosic particles. The resin has a nitrogen content of from about 0 to 3%, a viscosity of from about 20 to 2000 cps at 20° C., and a molar ratio of formaldehyde/phenol of from about 1.2 to 3.0. The green lignocellulosic particles treated with the resin are dried until the particles have a moisture content of from 1 to 8%. A second resin is added to the dried particles and then the dried particles are consolidated under heat and pressure to form the engineered panel.

18 Claims, No Drawings

PROCESS FOR MAKING ENGINEERED LIGNOCELLULOSIC-BASED PANELS

FIELD OF THE INVENTION

This invention generally relates to a method for making engineered lignocellulosic-based panels. More specifically, this invention relates to a method of making engineered lignocellulosic-based panels that produces low $NO_x$ emissions while at the same time delivers engineered lignocellulosic-based panels having good strength and dimensional stability.

BACKGROUND OF THE INVENTION

Engineered lignocellulosic-based panels, such as oriented strandboard, high-density fiberboard, medium density fiberboard, chipboard, particleboard, hardboard, laminated veneer lumber and plywood, are commonly used as roof, wall and floor sheathing in the construction of buildings and residential homes. A significant portion of this construction occurs outdoors at the building site. Thus, the engineered lignocellulosic-based panels are vulnerable for a period of time to rain or snow. It is well known that exposure to water can cause engineered lignocellulosic-based panels to undergo dimensional expansion. For instance, many engineered lignocellulosic-based panels will swell in thickness by a factor that is substantially greater than that experienced in the width and length dimensions and that swell is often inelastic in response to a wet/redry cycle. Thus, engineered lignocellulosic-based panels have a tendency to expand in thickness during their first exposure to water, and if the panel is later dried, the thickness dimension might decrease to some extent, but it does not return to its original value. Thus, the builder is faced with the dilemma of coping with roof, wall and floor surfaces that are geometrically irregular.

A second problem that often occurs when engineered lignocellulosic-based panels are exposed to water is a reduction in strength or structural load-carrying capacity. In addition to exposure to water during construction, exposure to water can also occur during occupancy of the structure. For example water can be introduced into the structure by wind-driven rain, which can be forced through leaks around various structure elements, such as doors, windows and roofs. Inadequate seals in water pipes can also cause engineered lignocellulosic-based panels to be exposed to water. Additionally, recent construction practices tend to result in buildings with reduced levels of ventilation. This condition can cause the accumulation of moisture inside of buildings, especially in wall cavities, crawl spaces and attics. The ability of the engineered lignocellulosic-based panels to withstand these insults for some extended period of time without significant loss of structural properties or the development of mold or incipient decay is an important quality.

Companies that manufacture engineered lignocellulosic-based panels have recognized the problems associated with exposure to water for many years. In an effort to improve the properties of engineered lignocellulosic-based panels in a wet environment a number of technologies have been developed and implemented. For instance, wax is typically incorporated into engineered lignocellulosic-based panels in order to retard the penetration of water. Also, most engineered lignocellulosic-based panels are treated on the edges with a sealant, which helps the panel to resist the absorption of water at the edges where thickness swell is most prominent and problematic.

It is generally believed that many of the properties associated with engineered lignocellulosic-based panels could be improved if higher binder levels were used. Unfortunately, a variety of constraints make it difficult for engineered lignocellulosic-based panels manufacturers to utilize higher binder levels.

To overcome these problems U.S. Pat. No. 3,632,734 described a non-conventional method for manufacturing engineered lignocellulosic-based panels. This patent describes a method for reducing swelling in engineered lignocellulosic-based panels that is based on the following key steps: a phenol-formaldehyde impregnating resin is applied to green wood particles at a level of about 4–8%; the treated green wood particles are dried under temperature conditions that avoided pre-cure of the impregnating resin; a phenol-formaldehyde resin binder is then applied to the dried wood particles at a level of about 4–8%; and the treated particles are formed into a mat and subjected to heat and pressure to form a panel and cure the resins.

It should be noted that urea is typically added to phenol-formaldehyde resin binders in an attempt to limit emissions of formaldehyde. When urea is heated as the green strands are subsequently dried at elevated temperatures, the urea produces an ammonia emission. The ammonia emission can result in a $NO_x$ emission if the ammonia is processed through a pollution control device known as a Regenerative Thermal Oxidizer (RTO). There are regulatory limitations associated with such $NO_x$ emissions. If the plant does not have an RTO, or some other heat system that puts resin emissions through a burner, there will be no $NO_x$ formed, although in that case ammonia would still be emitted to the atmosphere.

More recently, U.S. Pat. No. 6,572,804 discloses the application of a phenol-formaldehyde resin to green strands and subsequent drying of the strands in the presence of methyol urea. The dry treated strands are optionally blended with more binder and are eventually consolidated under heat and pressure to yield a building panel. The patent discloses a new phenol-formaldehyde resin binder that is produced by adding urea to a liquid phenol-formaldehyde resin and subsequently adding formaldehyde to the same resin in order to convert the free urea into methyol urea. The patent claims that the new phenol-formaldehyde resin binder is less likely to emit ammonia than a conventional phenol-formaldehyde resin binder that was made with only a post addition of urea. Unfortunately, the methyol urea adduct has the potential to emit significant levels of both ammonia and formaldehyde when it is heated.

Thus, there continues to be a need for engineered lignocellulosic-based panels with improved performance in the presence of water. It is recognized that such a panel could be made by use of "green-strand-blending". However, in order to satisfy emission requirements, the resin used in the green-strand-blending process must not emit significant levels of ammonia or volatile organic compounds, including formaldehyde, phenol and methanol.

SUMMARY OF THE INVENTION

The present invention provides a method for making engineered lignocellulosic-based panels by adding a low-nitrogen content phenol-formaldehyde resin to green flakes before they are dried. During the drying process the phenol-formaldehyde resin with low-nitrogen content emits low levels of volatile compounds, including ammonia, and can be used without significantly increasing $NO_x$ emissions. The present invention also provides engineered lignocellulosic-based panels having high strength and low edge swell.

DETAILED DESCRIPTION OF THE PREFERRED EMBODIMENT

In accordance with the present invention there is provided a process to manufacture engineered lignocellulosic-based panels. The lignocellulosic-based panels are produced from green lignocellulosic particles. The term "green lignocellulosic particles" means that the particles are obtained from undried wood and generally have a moisture content of 30–200%, where moisture content equals 100%×(wet wood mass)/(dry wood mass). Generally, most logs delivered to a commercial mill would have such a moisture content. Other ways to obtain such such a moisture content are to use logs of wood that were placed in a vat or hot pond when they entered the manufacturing facility to help thaw the wood and/or remove dirt and grit from the logs. Alternatively, the logs selected would be those retained in an outside storage lot before being brought into the manufacturing facility for flaking. Each of these techniques introduces moisture into the logs. Debarked logs are then run through a flaker to provide particles having certain properties, such as specific length, width and thickness. In a conventional OSB manufacturing process, green logs are debarked and then cut into strands, which on average can be about 1 to 14 inches long, preferably 3 to 9 inches long, about 0.25 to 2 inches wide, and about 0.01 to 0.10 inches thick. The use of a peeler to form discrete layers or plys useful in manufacturing plywood or composite products, such as laminated veneer lumber, can be substituted for a flaker and is within the scope of the invention.

The machines that are used to cut the particles work best on relatively wet wood. Thus, the relatively large sections of wood that are utilized by the particle-cutting machines usually have a moisture content of 30–200 percent. Typically, the green lignocellulosic particles are stored in a green bin or wet bin before drying to specified manufacturing moisture content.

A first resin is added to the green lignocellulosic particles before the green particles are dried. The first resin is added in an amount from about 1 to 25 weight percent based on the total weight of the particles. More preferably, from about 5 to 15 weight percent based on the total weight of the particles. The first resin is high molecular weight phenol-formaldehyde resin having a low nitrogen content.

Optionally, wax may be added to the green lignocellulosic particles with the first resin. Waxes suitable for the present invention are usually hydrocarbon mixtures derived from a petroleum refining process. They are utilized in order to impede the absorption of water, and thus make the product more dimensionally stable in a wet environment for some limited period of time. These hydrocarbon mixtures are insoluble in water and have a melting point that is commonly between 35–70° C. Hydrocarbon waxes obtained from petroleum are typically categorized on the basis of their oil content. "Slack wax", "scale wax", and "fully refined wax" have oil content values of 2–30%, 1–2% and 0–1%, respectively. Although high oil content is generally believed to have an adverse effect on the performance of a wax, slack wax is less expensive than the other petroleum wax types, and is thus used almost exclusively in engineered panels. Alternatively, waxes suitable for the present invention can be any substance or mixture that is insoluble in water and has a melting point between about 35–120° C. It is also desirable for the wax to have low vapor pressure at temperatures between about 35–200° C. An example of such a wax, and is not derived from petroleum, is known as NaturaShield, which is a wax derived from agricultural crops and made available to the engineered panel industry by Archer Daniels Midland [Mankato, Minn.]. The wax, if added, would be in an amount of from about 0.25 to 3 percent (based on a wt % of solid binder to oven-dry wood). Although wax can be added at this point in the process it is preferred that the wax be added after the drying stage as discussed below.

For the purpose of this invention the term "high molecular weight" means that 40–100% of the solute portion of the phenol-formaldehyde resin will not spontaneously diffuse through a dialysis membrane comprised of regenerated cellulose and having a known molecular weight cut-off of 3,500 Da. Such membranes are known in the art. One such membrane is commercially manufactured and sold under the trade name Spectra/Por by Spectrum Laboratory Products, Inc. [New Brunswick, N.J.]. The dialysis membranes are commonly produced as bags, which can be loaded with either resin or an aqueous diluted form of the resin. The loaded bag is then typically suspended in a reservoir of water, which is gently stirred or otherwise agitated. Under these dialysis conditions molecules in the resin that have a molecular weight of about 3,500 Da and less will spontaneously diffuse out of the dialysis bag and into the reservoir. Typically, this process is relatively slow and might proceed for several days. Generally, the water in the reservoir is repeatedly replaced with fresh de-ionized water. The process is complete when an equilibrium state of molecular migration has been achieved.

In a broad embodiment of the invention the low-nitrogen content, high molecular weight, phenol-formaldehyde resin exists as an aqueous solution, emulsion or suspension. The resin has a nitrogen content of from about 0 to 3%, preferably from about 0 to 1%; a percent solids value of from about 10 to 70%, preferably from about 25 to 60%; a viscosity of about 20 to 2000 cps at 20° C., preferably from about 50 to 300 cps; a pH level of from about 7 to 14, preferably from about 9 to 12; and a molar ratio of formaldehyde/phenol of from about 1.2 to 3.0, preferably from about 1.2 to 2.0. The resin has an alkalinity value of from about 4 to 15% where alkalinity is defined as 100%×(sodium hydroxide content)/(total solids content). Based on these criteria, the resin would be considered a resole, and not a novolak resin.

In all cases, the low-nitrogen content, high molecular weight, phenol-formaldehyde resin to be applied to the green lignocellulosic particles is applied before the particles are dried. Such as before the drier, after, or in, the green or wet bin, between the green or wet bin and flaker or peeler, at the exit of the flaker or peeler, and even in the hot pond, or treatment vat for treating logs (either debarked or whole). Resin application can be by spray nozzles or through a conventional spinner disc atomizer. Other methods (such as falling curtain) of applying the resin may be employed so long as the choice of application ensures that the desired amount of resin is applied uniformly to the particles. Though less effective than applying the resin to the green lignocellulosic particles whose surface area has already been increased (e.g., by flaking or peeling), the invention is also applicable to all phases of board preparation, provided that at least some resin is applied upstream of the drier.

The green lignocellulosic particles thereafter are sent to dryers to dry the lignocellulosic particles to a moisture content of about 1 to 10%, preferably 1 to 3 wt percent.

Dried lignocellulosic particles are stored in dry bins until blended with resin binders, waxes and possibly other conventional additives.

Blending is where resin binder and wax (emulsion or slack) are typically added to the dried lignocellulosic particles. The resin binder is typically a phenol-formaldehyde (PF) resole resin such as Georgia Pacific's 70CR66 (liquid) and Dynea's 2102-83 (powdered); or polymeric diphenylmethane diisocyanate (pMDI) such as Huntsman's Rubinate® 1840. Resin binders are typically applied at rates between 1.7% to 8.0% (based on a wt % of solid binder to oven-dry wood). More preferably, at a level of about 3 to 6%. The wax, if added, would be as described above with regard to the first resin applied prior to drying. The wax would be applied in an amount of from about 0.25 to 3 percent (based on a wt % of solid binder to oven-dry wood), preferably from 1 to 2%. Examples of suitable waxes include ESSO 778 (ExxonMobil) and Borden's EW-465.

The blended lignocellulosic particles are transferred to forming bins, which are used to meter the lignocellulosic particles onto a forming surface, such as a forming belt. The forming bins contain orienter rolls or discs, which orient the flakes in either the direction of the forming line or transverse to the direction of forming line, travel. The forming bins also control the limit of the amount of lignocellulosic particles falling onto the forming surface, which controls the finished panel density, which is usually between 36 and 50 pounds per cubic foot.

In some engineered panels, some of the lignocellulosic particles prepared are destined for the top and bottom layers of the panel and these lignocellulosic particles are known as surface-layer particles. Other particles are destined for the middle layer or layers of the engineered panel and these particles are known as core-layer particles. The surface-layer particles are treated with surface-layer binder resin and wax. Likewise, the core-layer particles are treated with core-layer binding resin and wax. In many cases the surface-layer binder resin is different than the core-layer binder resin. The treated particles are then formed into a mat that is comprised of three or more layers. In most cases the surface-layer particles in the mat are partially oriented parallel to the machine direction of the forming line. Conversely, the core-layer particles in the mat are generally partially oriented parallel to the cross direction of the forming line, although they can also be partially oriented parallel to the machine direction of the forming line or randomly oriented.

The forming surface travels under forming heads creating a continuous mat of oriented particles. These mats are typically cut to specific lengths and loaded onto a pre-loader or loading cage that is a staging area for a full press-load of mats.

The invention has applicability to all known board manufacturing processes, including those using heated press platens, steam injection, catalyst injection, microwave or radio frequency (RF), heating and continuous and semi-batch pressing operations.

As an illustration, when using heated press platens, the mat is then placed between two hot platens and subjected to heat and pressure. The temperature of the hot platens can be from 300° F. to 460° F., preferably from about 380 to 430° F. As the platens in the press begin to close on the mat, the pressure increases to a maximum of about 500–800 psi, and maximum pressure generally occurs when the platens initially reach the point of maximum closure. Typically, the platens are maintained in this position of maximum closure for a period of time that is required to cure the resin binder. Sometimes this period is known as the "cook-time". During this pressing process adjacent particles are consolidated and become joined together as the different binder resins solidify. Generally, the temperature and moisture content of the portion of the consolidated mat that is nearest to the top and bottom hot platens is sufficient to plasticize the lignin in the particles, and the force of the platens is sufficient to compress the native structure of the lignocellulosic particles. Thus, the density of the outer layers of the compressed mat is usually significantly higher than the density of the original lignocellulosic particles. Eventually the pressure is relieved from the consolidated mat by increasing the gap between the top and bottom platens. As this occurs, the strength of the particle-to-particle bonds exceeds any internal pressure that might exist within the mat. Internal pressure commonly exists due to the presence of steam, which becomes trapped within the mat. If the internal steam pressure exceeds the strength of the particle-to-particle bonds in some localized area, then the board will rupture or explode as the press opens. The internal steam pressure that develops in the compressed mat is generally closely related to the moisture content that existed in the mat just prior to pressing.

The conditions of elevated temperature, pressure, and time can be varied to control the cure time. Catalyst can also be introduced during the processing steps to optimize the pressing times or to shorten the overall pressing time. The finished panels are thereafter usually cut to size, stacked, painted and packaged for delivery to the customer.

The resulting engineered lignocellulosic-based panels have improved dimensional stability and strength properties, while simultaneously avoiding a significant increase in ammonia and/or $NO_x$ emissions and with minimal increase in organic emissions during processing.

The invention is further illustrated by the following examples:

Resin A

A phenol-formaldehyde resin was prepared in the following manner. A 2 liter reactor was charged with a 90% phenol solution (aq) (626.4 g; 6.0 moles) [from Spectrum Chemical Manufacturing Corporation; New Brunswick, N.J.], 91% paraformaldehyde prill (330.0 g; 10.0 moles) [from the Ashland Distribution Company; Columbus, Ohio], water (600.0 g) and 50% sodium hydroxide solution (aq) (10.0 g) [from the Integra Chemical Company; Renton, Wash.]. The mixture was stirred and heated to a temperature of 85° C. over a period of 20 minutes. The temperature was maintained at 85° C. until the viscosity of the mixture was an 'A' as determined by Gardner-Holdt bubble tubes at a temperature of 20° C. A charge of 50% sodium hydroxide solution (aq) (10.0 g) was then added to the reactor and the temperature was reduced to 80° C. The temperature was maintained at 80° C. until the viscosity of the mixture was an 'H' as determined by Gardner-Holdt bubble tubes at a temperature of 20° C. The mixture was then cooled to a temperature of 20° C. and a final charge of 50% sodium hydroxide solution (aq) (200.0 g) was added to the reactor with continued stirring. The resulting resin had a solids content of 46.7%, a pH value of 11, a density of 1.20, a viscosity of 144 cps (Gardner-Holdt @ 20° C.), a nitrogen content of less than 1% and a molar ratio of formaldehyde/phenol of 1.67.

Resin B

A phenol-formaldehyde resin was prepared in the following manner. A 20 liter reactor was charged with a 90% phenol solution (aq) (6264 g; 60.0 moles) [from Spectrum Chemical Manufacturing Corporation; New Brunswick, N.J.], 37% formalin (7290 g; 90.0 moles) [from the Integra Chemical Company; Renton, Wash.], and 50% sodium hydroxide solution (aq) (100.0 g) [from the Integra Chemical Company; Renton, Wash.]. The mixture was stirred and heated to a temperature of 85° C. over a period of 20 minutes. The temperature was maintained at 85° C. until the viscosity of the mixture was an 'A' as determined by Gardner-Holdt bubble tubes at a temperature of 20° C. A charge of 50% sodium hydroxide solution (aq) (100.0 g) was then added to the reactor and the temperature was reduced to 80° C. The temperature was maintained at 80° C. until the viscosity of the mixture was an 'H' as determined by Gardner-Holdt bubble tubes at a temperature of 20° C. The mixture was then cooled to a temperature of 20° C. and a final charge of 50% sodium hydroxide solution (aq) (2100.0 g) was added to the reactor with continued stirring. The resulting resin had a solids content of 51.9%, a pH value of 11, a density of 1.21, a viscosity of 347 cps (Gardner-Holdt @ 20° C.), a nitrogen content of less than 1% and a molar ratio of formaldehyde/phenol of 1.50.

Resin C

A phenol-formaldehyde resin was prepared in the following manner. A 20 liter reactor was charged with a 90% phenol solution (aq) (6264 g; 60.0 moles) [from Spectrum Chemical Manufacturing Corporation; New Brunswick, N.J.], 91% paraformaldehyde prill (2700 g; 81.9 moles) [from Spectrum Chemical Manufacturing Corporation; New Brunswick, N.J.], water (2700 g) and 50% sodium hydroxide solution (aq) (100.0 g) [from the Integra Chemical Company; Renton, Wash.]. The mixture was stirred and heated to a temperature of 85° C. over a period of 20 minutes. The temperature was maintained at 85° C until the viscosity of the mixture was an 'A' as determined by Gardner-Holdt bubble tubes at a temperature of 20° C. A charge of 50% sodium hydroxide solution (aq) (100.0 g) was then added to the reactor and the temperature was reduced to 80° C. The temperature was maintained at 80° C. until the viscosity of the mixture was an 'H' as determined by Gardner-Holdt bubble tubes at a temperature of 20° C. A charge of 50% sodium hydroxide solution (aq) (300.0 g) and water (5000 g) was then added to the reactor and the temperature was adjusted to 80° C. The temperature was maintained at 80° C. until the viscosity of the mixture was an 'F' as determined by Gardner-Holdt bubble tubes at a temperature of 20° C. The mixture was then cooled to a temperature of 20° C. and a final charge of 50% sodium hydroxide solution (aq) (500.0 g) was added to the reactor with continued stirring. The resulting resin had a solids content of 41.5%, a pH value of 10.5, a density of 1.16, a viscosity of 176 cps (Gardner-Holdt @ 20° C.), a nitrogen content of less than 1% and a molar ratio of formaldehyde/phenol of 1.37.

Resin D

A phenol-formaldehyde resin was prepared in the following manner. A 4 liter reactor was charged with a 90% phenol solution (aq) (803.9 g; 7.7 moles) [from Spectrum Chemical Manufacturing Corporation; New Brunswick, N.J.], 91% paraformaldehyde prill (382.4 g; 11.6 moles) [from Spectrum Chemical Manufacturing Corporation; New Brunswick, N.J.], water (625.0 g) and 50% sodium hydroxide solution (aq) (12.0 g) [from the Integra Chemical Company; Renton, Wash.]. The mixture was stirred and heated to a temperature of 85° C. over a period of 20 minutes. The temperature was maintained at 85° C. until the viscosity of the mixture was an 'A2' as determined by Gardner-Holdt bubble tubes at a temperature of 20° C. A charge of 50% sodium hydroxide solution (aq) (12.0 g) was then added to the reactor and the temperature was reduced to 80° C. The temperature was maintained at 80° C. until the viscosity of the mixture was a 'B' as determined by Gardner-Holdt bubble tubes at a temperature of 20° C. A charge of 50% sodium hydroxide solution (aq) (25.0 g) and water (635.0 g) was then added to the reactor and the temperature was adjusted to 75° C. The temperature was maintained at 75° C. until the viscosity of the mixture was an 'J' as determined by Gardner-Holdt bubble tubes at a temperature of 20° C. A charge of 50% sodium hydroxide solution (aq) (50.0 g) and water (635.0 g) was then added to the reactor and the temperature was adjusted to 75° C. The temperature was maintained at 75° C. until the viscosity of the mixture was an 'J' as determined by Gardner-Holdt bubble tubes at a temperature of 20° C. The mixture was then cooled to a temperature of 20° C. and a final charge of 50% sodium hydroxide solution (aq) (71.0 g) was added to the reactor with continued stirring. The resulting resin had a solids content of 30.1%, a pH value of 11, a density of 1.10, a viscosity of 77 cps (Gardner-Holdt @ 20° C.), a nitrogen content of less than 1% and a molar ratio of formaldehyde/phenol of 1.50.

EXAMPLE 1

An aliquot of this Resin A was subjected to a specific heating process in a distillation apparatus (emissions test). The distillate was collected in five fractions and each of these was assayed for ammonia, formaldehyde, phenol and methanol levels.

Comparative A

An aliquot of PD 115 from Borden Chemical Incorporated, believed to be the novel resin described in U.S. Pat. No. 6,572,804 was also subjected to the emissions test.

Comparative B

An aliquot of 70CR66 from the Georgia-Pacific Resins Corporation, which is a conventional surface-layer phenol-formaldehyde resin, was also subjected to the emissions test.

EMISSIONS TEST

All distillations were conducted by use of the following process:

Apparatus & Set Up:

1. A new 3-necked 1-liter round bottom flask was washed with hot water and detergent and then rinsed with acetone. The flask was dried with air before proceeding to the next step.
2. The clean flask was weighed and then charged with resin (5.0 g), deionized water (250.0 g) and Dow-Corning 200 Fluid 200 cs (250.0 g) [obtained from Dow-Corning; Midland, Mich.]. The total mass of the loaded flask was measured.
3. The loaded flask was installed into a fractional distillation apparatus. An oil heating bath was mounted to a stage just beneath the distillation flask. The vertical position of the stage was readily adjusted. The distillation flask was further equipped with a thermal probe, an air purge line, and a motor-driven stirring paddle (100–300 rpm). The stirring rate was sufficient to thoroughly homogenize the contents of the flask and also provided excellent transfer of heat between the flask surface and the oil bath. There was no initial airflow into the flask through the purge line. The oil in the heating bath had an initial temperature of about 23°

C. and was agitated with a magnetic stirring bar. A branched joint connected the distillation flask to a condenser. An "upper" addition funnel was mounted directly over the condenser through the branched joint. Two "lower" addition funnels were mounted in series directly beneath the condenser. Receiving vials were placed in a cold water bath (13–15° C.) under the "lower" addition funnels.

4. The side-arm valves on the lower addition funnels were initially kept in an open position.
5. The outlet valve and the side-arm valve on the upper addition funnel were initially kept in a closed position. The upper addition funnel was not initially charged with water.
6. Cold water was circulated through the jacket of the condenser.

RUN:

1. The heater beneath the oil bath was turned on at about 100% power and the stirring bar was activated. The temperature of the oil bath and the flask contents were measured and recorded every 2.5 minutes throughout the duration of the run.
2. When the temperature of the oil bath was about 190–220° C., the heating power was reduced to about 60–80%. For most samples an attempt was made to maintain the temperature of the oil bath in the range of 210–220° C. until the contents of the flask had dehydrated.
3. In all runs the temperature of the flask contents increased to about 101° C. during the first 22 minutes. A temperature of about 101–105° C. was spontaneously maintained for an extended period of time. In most runs the first drop of condensate was observed at about 24–25 minutes.
4. The rate of condensation for the portion of the run subsequent to collection of the first drop of condensate and prior to the sample dehydration point was about 4–5 mL/minute. The appearance of the flask contents was observed and recorded throughout each run.
5. An attempt was made to obtain a collection volume for each distillate fraction of about 60 mL, which required about 15 minutes of run time. When a collection vial had been filled with about 60 mL of distillate, the following steps were used to isolate and secure the fraction. First, the outlet valve of the bottom, lower addition funnel was closed. Second, the collection vial was carefully removed from the cold water bath and wiped dry with a towel. The loaded vial was then weighed in order to determine the amount of distillate collected. The vial was then capped. A fresh collection vial was then labeled, tarred and positioned into the cold water bath beneath the bottom, lower addition funnel. The outlet valve on this lower addition funnel was then opened. The collection time and mass of each fraction were recorded.
6. Eventually, in each run the temperature of the flask contents would begin to rise at a rate of about 1° C./minute. At this point in time cold water (250.0 g) was loaded into the upper addition funnel. The fourth collection vial was replaced with the fifth collection vial, which had an 8-oz volume. The upper addition funnel was capped on top and the side valve was opened. The outlet valve was partially opened in order to yield a flow rate out of the upper addition funnel of about 10–15 mL/minute. The side valves on the lower addition funnels were both closed and the air-inlet valve attached to the distillation flask was opened. The flow of air into the distillation flask was initiated and maintained at about 115–120 mL/minute, which was gauged by use of a flow meter. When the air was turned on the temperature of the flask contents would immediately begin to increase at a rate of about 8° C./minute. The heater for the oil bath was adjusted to 100% power.
7. The temperature of the flask contents was allowed to rise to a temperature of 220° C. As soon as this critical temperature was reached, the oil bath heater was turned off and the run was stopped on the next 2.5 minute interval. The airflow into the distillation flask and the water flow from the upper addition funnel were both shut off during the final 30 s of each run.
8. At the end of the run the fifth fraction sample was isolated and weighed as previously described. The residual amount of water in the upper addition funnel was measured and this information was used to determine the amount of water from this funnel that had been added to the fifth fraction. The hot oil bath was lowered and moved to another storage location. The distillation flask was isolated from the apparatus. The thermal probe and the stirring paddle were removed from the distillation flask. An attempt was made to leave as much of the flask residue in the distillation flask as possible. Flask content losses were estimated to be less than 1 g. The mass of the distillation flask plus the residue was measured and compared to the initial mass of the fully loaded distillation flask. In this manner we were able to estimate the amount of flask content that was transferred out of the distillation flask during the run. This value was compared to the sum of the collected fractions in order to calculate the yield for the run. All runs had yield values of 97 to 99%.

Collected fractions were quantitatively assayed for ammonia, formaldehyde, phenol and methanol. The phenol and methanol levels were determined by use of HPLC (EPA method 604). The ammonia level was determined by use of EPA method 350.1 (calorimetric indophenol method). The formaldehyde level was determined by a modified version of ASTM D6303 (colorimetric 3,5-diacetyl-1,4-dihydro-lutidine method). Internal recovery studies for these methods demonstrated recovery values that were 100%+/−21% for ammonia, 100%+/−1% for formaldehyde, 100%+/−1% for phenol, and 100%+/−10% for methanol.

TABLE 1

Resin Emission Results*

| RESIN | AMMONIA | FORMAL-DEHYDE | PHENOL | METHANOL |
|---|---|---|---|---|
| Resin A | 0.02 | 40.4 | 19.8 | 3.63 |
| Borden PD115 | 36.7 | 113 | 0.53 | 3.72 |
| GP 70CR66 | 23.8 | 52.1 | 23.4 | 9.11 |

*Note:
emission results are expressed as milligrams of emission per gram of resin solids.

Thickness Swell & Internal Bond Experiment 'A'

Resin 'B' was used in conjunction with the green lignocellulosic particles to make OSB panels. Specifically, resin 'B' was applied to a mixture of green strands (MC=92%) (predominantly aspen, but also comprised of pine, maple and birch) at a loading level of 9.0% based on the solids content of the resin and the dry mass of the wood. The treated strands were subsequently dried in an oven at a temperature of 85° C. to a moisture content of about 2%. The dried strands were then further treated with slack wax (1.25% load level) and phenol-formaldehyde bonding resin in a laboratory blender [surface layer resin=Georgia-Pacific 70CR66 (4.0% load level); core layer resin=Georgia-Pacific 265C54 (4.0% load level)]. The resulting strands were formed into random mats and hot-pressed for 330 seconds with a platen temperature of 400° F. to yield panels that were 0.78 inches thick. These panels were then sanded on both the top and bottom surfaces to yield panels that were 0.72 inches thick. Wood content was held constant at 35 lb/ft$^3$ for the two panel types, resulting in test panels with an average density of 40.2 lb/ft$^3$ and control panels with an average density of 37.5 lb/ft$^3$ after pressing. This same process was used to make control panels with no resin applied to the strands prior to drying. The same conventional bonding resins were applied to both board types at the same loading levels. The two different board types were equilibrated under conditions of 70° F. and 50% relative humidity for a period of about one-week. Both sample types were then submerged in water for a period of two days and then dried in an oven at a temperature of 85° C. for a period of one day. The thickness swell exhibited by each panel type as a result of this exposure to water was measured and is shown along with internal bond data in Table 2.

TABLE 2

Thickness Swelling and Internal Bond Data.

| PANEL | Thickness Swelling (%) Edge Average | Thickness Swelling (%) Center Average | Internal Bond (psi) As-Is [1] | Internal Bond (psi) Single Cycle [2] | Internal Bond (psi) Six Cycle [3] |
|---|---|---|---|---|---|
| Control (no resin applied to green lignocellulosic particles) | 20.9 | 8.5 | 26.2 | 5.5 | 2.9 |
| Resin B applied to green lignocellulosic particles | 8.7 | 3.0 | 33.0 | 12.8 | 9.5 |

[1] Tested in "as-is" condition.
[2] Tested dry after one cycle of 30 minutes vacuum pressure soak in 150° F. water, 30 minute soak at atmospheric pressure in 150° F. water, and 15 hours of drying at 180° F. in a forced air oven.
[3] Tested dry after six cycles of 30 minutes vacuum pressure soak in 150° F. water, 30 minute soak at atmospheric pressure in 150° F. water, six (6) hours of drying at 180° F. in a forced air oven, 30 minutes vacuum pressure soak in 150° F. water, and 15 hours of drying at 180° F. in a forced air oven.

Thickness Swell & Internal Bond Experiment 'B'

Resin 'C' was used in conjunction with the green lignocellulosic particles to make OSB panels. Specifically, resin 'C' was applied to green southern yellow pine strands (MC=92%) at a loading level of 9.0% based on the solids content of the resin and the dry mass of the wood. The treated strands were subsequently dried in an oven at a temperature of 85° C. to a moisture content of about 2%. The dried strands were then further treated with slack wax (1.25% load level) and phenol-formaldehyde bonding resin in a laboratory blender [surface layer resin=Georgia-Pacific 70CR66 (4.0% load level); core layer resin=Georgia-Pacific 265C54 (4.0% load level)]. The resulting strands were formed into random mats and hot-pressed for 200 second with a platen temperature of 4000 F to yield panels that were 0.500 inches thick. Wood content was held constant at 35 lb/ft$^3$ for the two panel types, resulting in test panels with an average density of 40.9 lb/ft$^3$ and control panels with an average density of 37.8 lb/ft$^3$ after pressing. This same process was used to make control panels with the exception that no resin was applied to the strands prior to drying. The same conventional bonding resins were applied to both board types at the same loading levels. The two different board types were equilibrated under conditions of 70° F. and 50% relative humidity for a period of about one-week. Both sample types were then submerged in water for a period of two days and then dried in an oven at a temperature of 85° C. for a period of one day. The thickness swell exhibited by each panel type as a result of this exposure to water was measured and is shown along with internal bond data in Table 3.

TABLE 3

Thickness Swelling and Internal Bond Data.

| PANEL | Thickness Swelling (%) 'Edge Average | Thickness Swelling (%) Center Average | Internal Bond (psi) As-Is [1] | Internal Bond (psi) Single Cycle [2] | Internal Bond (psi) Six Cycle [3] |
|---|---|---|---|---|---|
| Control (no resin applied to green lignocellulosic particles) | 22.5 | 14.6 | 32.8 | 8.8 | 4.4 |
| Resin C applied to green lignocellulosic particles | 8.3 | 5.9 | 44.4 | 20.6 | 12.0 |

[1] Tested in "as-is" condition.
[2] Tested dry after one cycle of 30 minutes vacuum pressure soak in 150° F. water, 30 minute soak at atmospheric pressure in 150° F. water, and 15 hours of drying at 180° F. in a forced air oven.
[3] Tested dry after six cycles of 30 minutes vacuum pressure soak in 150° F. water, 30 minute soak at atmospheric pressure in 150° F. water, six (6) hours of drying at 180° F. in a forced air oven, 30 minutes vacuum pressure soak in 150° F. water, and 15 hours of drying at 180° F. in a forced air oven.

What is claimed is:

1. A process for making engineered lignocellulosic-based panels, said process comprising:

adding to green lignocellulosic particles before the green particles are dried a low-nitrogen content, high molecular weight, phenol-formaldehyde resin in an amount from about 1 to 25 weight percent based on the total weight of the particles, wherein the first resin is phenol-formaldehyde resin having a nitrogen content of from 0 to 3%, a viscosity of about 20 to 2000 cps, and a molar ratio of formaldehyde/phenol of from 1.2 to 3.0;

drying the green particles to obtain dried particles having a moisture content of from 1 to 8%;

adding a second resin in an amount from about 1.7 to 8 weight percent based on the total weight of the particles; and consolidating the dried particles under heat and pressure.

2. The process of claim 1 wherein the low-nitrogen content, high molecular weight, phenol-formaldehyde resin has a solids content of from about 10 to 70%.

3. The process of claim 2 wherein the low-nitrogen content, high molecular weight, phenol-formaldehyde resin has a pH of from about 7 to 14.

4. The process of claim 1 wherein the low-nitrogen content, high molecular weight, phenol-formaldehyde resin has an alkalinity of from about 4 to 15.

5. The process of claim 1 wherein a wax is added in conjunction with the second resin.

6. The process of claim 5 wherein the wax is a petroleum based slack wax added in an amount of from about 0.25 to 3 percent, based on a wt % of solid binder to oven-dry wood.

7. The process of claim 1 wherein the second resin is selected from the group of phenol-formaldehyde resole resins and polymeric diphenylmethane diisocyanate resins.

8. The process of claim 7 wherein the second resin is a powdered or liquid phenol-formaldehyde resole resin.

9. The process of claim 7 wherein the second resin is a polymeric diphenylmethane diisocyanate resin.

10. A process for making engineered lignocellulosic-based panels, said process comprising:

adding to green lignocellulosic particles before the green particles are dried a low-nitrogen content, high molecular weight, phenol-formaldehyde resin in an amount from about 5 to 15 weight percent based on the total weight of the particles, wherein the first resin is phenol-formaldehyde resin having a nitrogen content of from 0 to 1%, a viscosity of about 50 to 300 cps, and a molar ratio of formaldehyde/phenol of from 1.2 to 2.0;

drying the green particles to obtain dried particles having a moisture content of from 1 to 8%;

adding a second resin in an amount from about 3 to 6 weight percent based on the total weight of the particles; and consolidating the dried particles under heat and pressure.

11. The process of claim 10 wherein the low-nitrogen content, high molecular weight, phenol-formaldehyde resin has a solids content of from about 40 to 60%.

12. The process of claim 10 wherein the low-nitrogen content, high molecular weight, phenol-formaldehyde resin has a pH of from about 9 to 12.

13. The process of claim 10 wherein the low-nitrogen content, high molecular weight, phenol-formaldehyde resin has an alkalinity of from about 4 to 15.

14. The process of claim 10 wherein a wax is added in conjunction with the second resin.

15. The process of claim 14 wherein the wax is a petroleum based slack wax added in an amount of from about 0.25 to 3 percent, based on a wt % of solid binder to oven-dry wood.

16. The process of claim 10 wherein the second resin is selected from the group of phenol-formaldehyde resole resins and polymeric diphenylmethane diisocyanate resins.

17. The process of claim 16 wherein the second resin is a powdered or liquid phenol-formaldehyde resole resin.

18. The method of claim 16 wherein the second resin is a polymeric diphenylmethane diisocyanate resin.

* * * * *